United States Patent [19]

Bendler et al.

[11] 3,984,127

[45] Oct. 5, 1976

[54] ROTARY POWER APPARATUS

[75] Inventors: Hellmut Bendler, Nurnberg; Uwe Brede, Schwaig; Egon Flach, Cologne-Riehl; Gerrit Scheiderer, Furth, all of Germany

[73] Assignee: Dynamit Nobel Aktiengesellschaft, Germany

[22] Filed: May 5, 1975

[21] Appl. No.: 574,338

[30] Foreign Application Priority Data
May 3, 1974 Germany............................ 2421400

[52] U.S. Cl.............................. 280/744; 180/82 C; 192/.07; 242/107; 242/107.4 R; 244/122 B
[51] Int. Cl.²......................................... B60R 21/10
[58] Field of Search.......................... 280/744, 746; 244/122 B; 180/82 C; 242/107.4 R, 107; 192/.07

[56] References Cited
UNITED STATES PATENTS
3,522,918  8/1970  Wrighton........................ 280/747 X
3,845,836  11/1974  Bendler........................... 280/744 X Primary Examiner—M. H. Wood, Jr.
Assistant Examiner—Michael J. Forman
Attorney, Agent, or Firm—Craig & Antonelli

[57]  ABSTRACT

A rotary power device for use in conjunction with tensioning mechanism of safety devices for the protection of passengers in vehicles and the like. The preferred embodiment disclosed is used for tensioning safety belts of a vehicle passenger restraint system in response to predetermined experienced deceleration such as occur in an accident situation. The rotary power device includes a rotary piston guided in a helically wound guide track such that the piston moves both rotatably and axially in response to compressed gas forces against a pressure face which extends in a plane containing the axis of rotation of the piston. A coupling bushing arrangement is interposed between the piston and the rotating shaft accommodating the safety belt, with axial movement of the piston with respect to the bushing and shaft, and with rotatable locking of the piston and shaft. In preferred embodiments, the rotary locking of the piston and the shaft is initiated only after the release of compressed gases causes an axial shifting of the bushing.

28 Claims, 7 Drawing Figures

ROTARY POWER APPARATUS

BACKGROUND AND SUMMARY OF THE INVENTION

This invention relates to a rotary power device, preferably for tensioning mechanisms of safety devices, in particular safety belts, for the protection of passengers in conveyances. Such a device includes a housing, a compressed-gas generator associated with the housing, and a compressed-gas-actuated drive element guided in the housing for a shaft to be rotated.

U.S. Pat. No. 3,845,836 to Bendler et al discloses a safety belt for the protection of the passengers of conveyances, e.g. airplanes or automotive vehicles, provided with a tensioning mechanism. This tensioning mechanism is triggered in an accident situation by means of a sensor upon exceeding a predetermined deceleration value and retracts and/or reels in the belt until the latter is in sufficiently close contact with the body of the passenger. Such a sensor has been described, for example, in German published unexamined application DOS 2,207,831. The tensioning mechanism, fashioned as a rotary power apparatus or element, has a housing with a compressed-gas generator arranged therein and with a shaft connected with the end of the belt to be retracted. The drive element for the shaft is a turbine wheel operated by means of compressed gas. To avoid injury to the passenger during the tensioning step, the tensioning mechanism cooperates with belt force limiters, such as a torsion bar or a friction (friction wheel) brake. Furthermore, a blocking device which becomes automatically effective is provided which arrests the belt at least for short-term stresses. For this purpose, a serrated ratchet wheel with a spring-loaded pawl can be used, for example.

A considerable increase in the protective effect of safety belts is attained by means of such tensioning devices if these belts — as is often the case under practical conditions — are applied relatively loosely by the passenger to avoid excessive restriction of his freedom of movement.

The protective effect is also improved by such tensioning mechanisms in conjunction with the so-called automatic belts which yield during slow movements but block during rapid motions and which, due to a restoring spring, always contact the passenger's body with slight tensile stress. This is so, because on the one hand the blocking systems of the automatic belts, which can be triggered by inertial forces, operate at a certain delay and on the other hand, the belt section wound on the shaft is applied thereto with a certain amount of looseness, rather than being reeled completely tightly thereon. Further, the belt itself is stretchable, and the seat, the clothing, as well as the upper part of the passenger's body are additionally compressed under the pressure action of the safety belt, so that in an accident situation an undersirably extensive forward movement of the passenger's body is still possible. By a retraction of the belt with the aid of such tensioning mechanisms, such undersirable forward movement can advantageously be avoided.

The number of revolutions to be executed by the shaft of the tensioning mechanism during the tensioning process depends on the retraction path required in an individual case, on the reel diameter, etc. In general, more than one revolution of the shaft is required, which is readily possible by means of the turbine wheel referred to above with its plurality of exposure surfaces arranged distributed along the periphery. However, a prerequisite for operation of the turbine wheel is a correspondingly long-term effect of the compressed gas on the individual exposure surfaces of the turbine wheel moving in succession past the compressed-gas generator whereby, in total, an often undesirable prolongation of the tensioning procedure occurs.

This invention contemplates apparatus which avoids the disadvantages in a rotary power element or device of the type mentioned hereinabove. That is, this invention contemplates a rotary power device such that, with a minimum of manufacturing expenses and with high reliability, this device makes it possible to execute more than one revolution of the shaft within a minimally short time period and at maximally low gas pressures.

The present invention provides that the drive element is constructed as a rotary piston with a piston surface which can be under the effect of the compressed gases, this piston being connected or connectible, via an annular-cylindrical piston foot (base), with the shaft in the peripheral direction by positive coupling and being displaceable axially with respect to this shaft. The rotary piston of the device of the present invention is furthermore guided in a helically wound duct of the housing arranged coaxially to the shaft, the lateral boundary walls of the duct extending to the piston foot. By means of constructing the drive element as an axially shiftable rotary piston with a single piston surface to be exposed to the compressed gases, it is advantageously possible, as contrasted to the turbine wheel, to immediately make the full gas pressure effective on the piston area so that the rotary piston has imparted thereto a high initial velocity and accordingly exerts advantageously a high torque on the shaft to be rotated. As the compressed-gas generator for the production of the compressed gases, it is possible, for example, to use a compressed-air bottle which is under a correspondingly high internal pressure. With a view toward minimum amount of space to be occupied by the device, however, a propellant charge element is preferably provided for the compressed-gas generator, ignitable electrically or mechanically by percussion and producting the compressed gases only during its reaction. The propellant charge element can be composed, for example, in accordance with the mixtures indicated in German Patent 1,646,313.

The connection between the rotary piston and the shaft is to be such that, on the one hand, the torque can be flawlessly transmitted from the rotary piston to the shaft and, on the other hand, the rotary piston is displaceable axially relative to the shaft with minimum forces. For this purpose, the shaft and the annular-cylindrical piston foot of the rotary piston can be fashioned, for example, in the manner of a multiple-groove (multiple-slot) profile. To render the manufacturing process maximally simple, however, the shaft and the piston foot are instead preferably provided with at least respectively one axial groove and a slide spring inserted therein, the latter establishing the positive connection in the peripheral direction but permitting in the axial direction the displacement between the shaft and the rotary piston.

The guide duct which is helically formed within the interior of the housing represents, so to speak, the cylinder for the rotary piston. The length of this duct is dependent on the number of revolutions to be executed by the rotary piston and/or by the shaft; this number of revolutions depends, for example, with the use of the rotary power element for tensioning mechanisms of safety devices, particularly safety belts, on the required retraction distance of the end of the safety device connected to the shaft to be rotated. The steepness or pitch of this duct is maintained, with a view toward a maximally short axial structural length of the housing, to be so small as permitted by the axial width of the rotary piston and by the thickness of the boundary walls required for reasons of strength. The boundary walls extend to the annular-cylindrical piston foot to prevent the compressed gases from flowing laterally around the rotary piston and escaping into the section of the guide duct disposed still in front of the rotary piston, since these compressed gases are not only lost for the advancement of the rotary piston, but would even brake the movement of the latter. To keep the friction losses at a minimum, it is advantageous to keep the play relatively large between the surfaces moving relatively to each other, except for a preferably narrow, strip-shaped zone on the two sides of the rotary piston and on the skirt surface thereof.

With the aforementioned connection possibilities between the rotary piston and the shaft, the two parts are initially positively coupled in the peripheral direction. Thus, the shaft cannot be freely rotated with respect to the rotary piston, for example, also during the normal operating condition of the automotive vehicle, i.e. prior to the beginning of the tensioning process. This embodiment of the rotary power element, therefore, is suitable, for example, for simple safety belts, the length of which does not automatically adapt itself to the respective situation but must rather be adjusted manually. However, in contrast to the embodiment discussed immediately above, in case of so-called automatic belts, the shaft, in the normal operating condition, must be freely rotatable with the one end of the safety belt wound thereon, since only in this case can the safety belt be unreeled off the shaft, for example when the passenger bends forward, and can again be wound up when the passenger leans back, by means of a restoring spring which sets the shaft into rotation.

In order to be able to employ the rotary power element or device of this invention even if the shaft to be rotated must be freely turnable up to the beginning of the drive process, for example in the tensioning procedure of an automatic belt, a further advantageous embodiment of the invention provides that a driving bush is arranged between the shaft and the piston foot, with respect to which the shaft is freely rotatable until the beginning of the drive process. At the beginning of the drive process, both the bush and the shaft are then positively lockable together in the peripheral direction in the axial advancing direction of the rotary piston, under displacement of the driving bush. Furthermore, the rotary piston is positively connected with the driving bush in the peripheral direction and is displaceable on the bush in the axial direction. The connection between the rotary piston and the driving bush is preferably effected by means of groove and spring — as indicated above for the direct connection of rotary piston and shaft. If, at the beginning of the drive process, the rotary piston is set into rotation under the effect of the compressed gas and is simultaneously advanced in the axial direction by the forced guidance in the helically wound guide duct, then the rotary piston entrains the driving bush due to friction thereagainst, i.e the piston shifts the bush forward in the axial direction until the bush is positively joined to the shaft in the peripheral direction so that the piston torque is transmitted to the shaft.

The positive connection in the peripheral direction between the driving bush and the shaft can be effected, for example, by means of a radial pin inserted in the shaft, which pin engages, after a corresponding rotation and axial displacement of the driving bush, in an axial slot of the latter. To be able to establish the positive connection between the driving bush and the shaft with maximum speed after the beginning of the drive process by the rotary piston, i.e. to transfer the rotary movement of the piston maximally early to the shaft, another suggestion of the invention provides instead that the driving bush has a serration on its annular end face located at the front — as seen in the axial advancing direction of the rotary piston — this serration, together with a corresponding serration on an opposite end face of the shaft establishing the locking action. The depth and width of the teeth are suitably chosen to be just as large as required for reasons of strength for the safe transmission of the torque, so that a minimum of axial displacement and optionally rotation of the driving bush are sufficient to get the two serrations to mesh with each other and thus to effect the locking in the peripheral direction.

According to a further suggestion of this invention, the opposite end face of the shaft is formed with a coupling sleeve pushed onto the shaft and firmly joined thereto. This affords the possibility of producing the coupling sleeve, just as the driving bush, of a material of a higher strength than the shaft. The coupling sleeve can be firmly joined to the shaft, for example, by means of a cross pin or by means of shrink fitting, but preferably the sleeve is firmly joined to the shaft by way of a further serration at its front end face which is in constant engagement with a corresponding serration of the shaft, so that with the same strength minimum structural sizes are obtained.

According to the invention, the further provision is made that the tooth flanks coming into contact with the counter teeth are — as seen from the bottom of the tooth — inclined, in case of the driving bush, to a minor extent in the rotation direction of the rotary piston and, in case of the shaft and/or the coupling sleeve, in opposition thereto. This effects advantageously an automatic reinforcement of the axial contact of the two meshing serrations.

To further shorten the time interval between the triggering of the compressed-gas generator and the mutual locking action between the driving bush and the shaft, another suggestion of this invention provides the formation of a small gas accumulation chamber behind the driving bush which is in the starting position. This gas backup chamber is connected with the pressure chamber or space between the compressed-gas generator and the rotary piston in the starting position, for example by way of an opening or bore. The compressed gases then are not only effective on the piston area of the rotary piston but also immediately on the rearward end face of the driving bush, whereby the latter is already shifted in the advancing direction of the rotary piston and is positively locked together with the shaft in the peripheral direction before the rotary piston proper has moved markedly in the axial direction and has exerted corresponding axial forces on the driving bush. This sudden effect on the driving bush and thus the locking together thereof with the shaft takes place so rapidly that the rotary motion of the rotary piston is advantageously transmitted to the shaft practically from the very beginning. The gas accumulation (backup) chamber is fashioned to be small to avoid an unnecessary expansion of the gases and an ensuing reduction in pressure.

To keep the friction during the relative movement between the driving bush and the shaft at a minimum, another suggestion of this invention provides a ball bearing between the shaft and the driving bush, wherein the balls are preferably distributed not only in a row along the circumference, but in axial succession in two or more rows, so that the forces exerted by the rotary piston on the driving bush and thus also on the shaft are transmitted over a maximally large surface area. However, in place of a ball bearing, it is also contemplated by the invention to provide a sliding bearing depending on the circumstances of each individual case, optionally together with an additional coating of an antifriction material, such as, for example, polytetrafluorethylene (= "Teflon").

The free rotatability of the shaft up to the beginning of the driving operation can, by the way, also be advantageously ensured by arranging, according to the invention, the driving bush rotatably on a trunnion coaxially disposed with respect to the shaft and firmly joined to the housing and providing that the driving bush is axially displaceable in the forward direction toward the shaft. The shaft and the trunnion are thus fashioned separately from each other, so that the mobility of the shaft is not affected by the driving bush until the driving bush has been shifted axially with respect to the shaft under the effect of the compressed gas, along the trunnion, and has been positively locked together with the shaft in the peripheral direction.

In connection with the ball or sliding bearing on the shaft, as well as in connection with the arrangement of a special trunnion for the driving bush, it is advantageous to maintain the radial play between the shaft or trunnion and the driving bush at a low level in the rearward zone of the bush, so that a minimum of compressed gas flows from the gas accumulation chamber behind the driving bush to the front end of the driving bush and perhaps also into the guide duct, and thus the displacement of the driving bush and the rotary piston is practically unimpeded thereby.

According to the invention, it is furthermore contemplated to arrange an annular sealing element in the zone of the rear end of the driving bush between the latter and the rotary piston to reduce the gas flow around the outside of the driving bush. The sealing element, fashioned for example as an O ring inserted in a corresponding annular groove, can simultaneously serve for the axial fixation of the driving bush with respect to the rotary piston until the beginning of the drive process, by forming this sealing element with a corresponding, radial overdimension, so that the driving bush and the rotary piston are frictionally joined with each other.

According to a further suggestion of the invention, the axial fixation of the driving bush up to the beginning of the drive process can be still further improved by fashioning the sealing element as an annular edge radially outwardly projecting on the driving bush and in contact with the piston foot, which edge can be sheared off. The driving bush is inserted by frictional connection with its annular shearing edge in a corresponding annular recess at the rear end of the rotary piston and thereby effects simultaneously an advantageous sealing action.

For obtaining a maximally favorable relationship between the pressure force effective on the rotary piston and the torque exerted by the latter, the piston area of the rotary piston under the exposure of the compressed gases is formed, according to the invention, as a planar surface lying in one of the axial planes of the piston. The term axial plane is understood to mean the planes extending through the longitudinal axis of the rotary piston. The longitudinal axis of the rotary piston extends coaxially to the axis of the shaft.

The length of the rotary piston, curved in correspondence with the helically wound guide duct, is to be selected so great that the pressure forces effective on the rotary piston are flawlessly transmitted to the piston foot, i.e. without destruction or undue deformation of the rotary piston. In general, an exceeding of this minimum length in the peripheral direction, required for reasons of strength, which also requires a correspondingly larger axial length of the rotary piston, should be avoided, since this requires, with an equally large angle of rotation, a correspondingly longer guide duct and thus also a housing which is longer in the axial extension. To maintain the friction between the rotary piston and the boundary walls of the guide duct at a minimum, the invention provides that the rotary piston is fashioned with an axial width and radial height which diminish in the direction of rotation. The smallest axial and radial play between the rotary piston and the boundary walls is thus limited to a small zone on the piston surface under the effect of the compressed gases. To reduce the axial width of the rotary piston, its two lateral surfaces are preferably inclined toward each other, which provides the further advantage that the rotary piston abuts with its front face the housing and/or the front end of the guide duct only after a larger angle of rotation.

To further reduce the friction, another embodiment of this invention provides that the rotary piston is equipped, close to the piston area under the effect of the compressed gases, with one or more notches or slots and with disk-shaped sealing elements inserted in such notch or notches which project outwardly to a minor extent in the axial and radial directions and are in contact with the wall of the duct formed within the housing. The notch or notches extends or extend, just as the piston area, preferably in axial planes and run practically up to the piston foot. A thin metal sheet of, for example, steel, aluminum, copper, or lead, but especially of brass, is frictionally mounted in the notch or notches. This makes it possible to increase the play between the rotary piston and the wall of the guide duct in the zones lying outside such notch or notches, as compared to a rotary piston without such notches, without thereby impairing the sealing effect with respect to the compressed gases.

To further reduce the gas leakage to the part of the guide duct in front of the rotary piston, it is contemplated according to this invention to provide the piston foot on its outer wall or skirt surface with a helically wound groove in which the boundary walls of the duct formed in the housing extend in the manner of the labyrinth seal.

The rotary piston is maintained, until the beginning of the drive (actuation) process, in the starting position with its piston area lying in opposition to the compressed gas generator. This fixation can be executed basically by inserting the rotary piston in the guide duct by friction seat (mounting), so that the piston can be shifted under the effect of the compressed gases, but cannot be displaced, for example, under the forces occurring during the normal operating condition. However, insofar as use is made of the aforementioned advantageous measures to reduce friction, such a friction mounting is unnecessary. In this case, according to a further feature of this invention, the rotary piston is held in its starting position by means of a shearing element. The shearing element is preferably fashioned as a safety pin (locking pin) disposed in an axial housing bore in a corresponding bore of the rotary piston.

For an advantageous exploitation of the energy of the compressed gases, it is furthermore recommended to arrange the compressed-gas generator and/or its outlet duct in the housing so that the compressed gases, in the starting position of the rotary piston, flow vertically against the piston area thereof, i.e. they are introduced essentially tangentially into the guide duct.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 4b is a radial view of the rotary piston of FIG. 4a; and

DETAILED DESCRIPTION OF THE DRAWINGS

Figure 1:
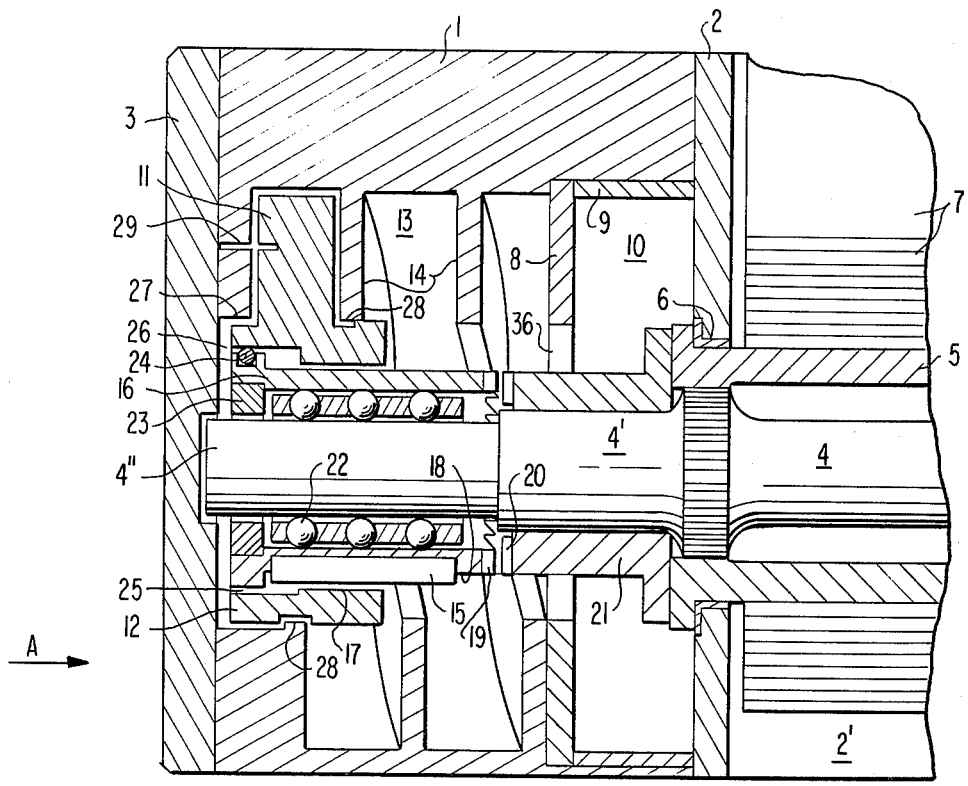
FIG. 1 is a sectional view along line I—I of FIG. 2 depicting a rotary power device of the present invention in conjunction with a safety belt wind up shaft.

The rotary power device, here shown as applied to a tensioning mechanism for safety belts, comprises according to FIG. 1 a housing 1 manufactured of steel and joined to a housing angle plate 2, 2' and a housing lid 3 by means of axially arranged screws, not shown. The lid 3 seals off the housing 1 toward the rear in a gas-tight manner. Shaft 4 is mounted in the housing angle plate 2 to be rotatable, by way of additional belt sleeve 5 joined to the shaft 4 and the bearing bush 6 of, for example, a synthetic resin such as polyethylene. A further bearing is provided, on the other shaft end, not shown, where also a blocking means is arranged which arrests the belt, or some other element to be tensioned, in the tensioned condition. The blocking means is triggered when a predetermined acceleration value has been exceeded and can be constructed, for example, in correspondence with the brake mechanism described in German unexamined published application DOS 2,058,883. One end of belt 7 is attached to the belt sleeve 5 and joined via this sleeve to the shaft 4. In the housing 1, separating disk 8 with a thrust ring 9 separates spring chamber 10 from the actual rotary power element. A spiral-shaped restoring spring, not shown, is arranged in the spring chamber 10 in a manner known per se; this restoring spring exerts such a torque on the shaft 4 and thus also on the belt sleeve 5 that the belt 7 always contacts the passenger's body under a slight tensile stress.

Between the housing lid 3 and the separating disk 8, the rotary power device is provided, including rotary piston 11 with an annular-cylindrical piston foot 12 and helically wound duct 13, the boundary walls 14 of this duct extending into the close proximity of the piston foot 12. The duct 13 has approximately one-and-a-half threads (windings), so that the rotary piston 11 and thus also the shaft 4 with belt sleeve 5 can execute during the tensioning step approximately one-and-a-half turns, corresponding, depending on the belt sleeve diameter, to a belt retraction distance of, for example, 150 – 200 mm.

The rotary piston 11 is joined to a driving bush 16 by means of the axially arranged slide springs 15 so that the piston is rotated under the effect of the compressed gas, together with the driving bush 16, and is simultaneously shifted axially toward the front on the driving bush in accordance with arrow A. The slide spring 15 is arranged in a groove 17 of the rotary piston 11 and in a groove 18 of the driving bush 16. The driving bush 16 has serration 19 on its annular end face at the front, opposed by serration 20 on the opposite end face of the coupling sleeve 21 disposed on the shaft section 4'. The two serrations 19, 20 are at a distance of, for example, 0.2 mm. from each other during the normal operating condition. The tooth height and basal width of the tooth amount, for example, to respectively about 2 mm.

Between the driving bush 16 and the shaft section 4'' disposed therein, ball bearing 22 is arranged with three rows of balls in axial succession. At its rear end, the driving bush 16 has a pressed-in cover ring 23, the radial play of this ring with respect to the shaft section 4'' being minor. The driving bush 16 furthermore comprises an annular sealing element in the zone of its rear end on its outer wall surface; this sealing element effects sealing and axial fixation with respect to the rotary piston 11. The top half of FIG. 1 depicts this sealing element as an O ring 24 inserted in a corresponding groove according to a first embodiment of the invention. As an alternative embodiment thereof, the lower half of the figure shows a construction with this sealing element in the form of an annular edge 25 which can be sheared off.

Gas accumulation (backup) chamber 26 is formed behind the driving bush 16. As can be seen more clearly in FIG. 2, this chamber is in communication, via recess (opening) 27, with the pressure space between the compressed-gas generator and the rotary piston 11 when the piston 11 is in the starting position. The annular-cylindrical piston foot 12 is extended with respect to the rotary piston 11 proper in the axial direction toward the front and the rear and has a helically wound groove 28 on its outer wall surface, which groove runs over its entire axial length. The boundary walls 14 of the duct 13 extend into these grooves with a radial play, thus effecting an additional sealing action in the manner of a labyrinth seal. The shearing element 29, here a shear pin disposed in corresponding axial bores, fixes the rotary piston 11 in its starting position with respect to the housing 1.

According to another non-illustrated embodiment, if a trunnion firmly joined with the housing 1 is provided in place of the ball bearing 22 for the driving bush 16, one must imagine that the shaft 4 is divided (severed) for example in the zone of the serrations 19, 20. The shaft section 4'' would then be manufactured, for example, integrally with the housing lid 3 and would extend, as a trunnion for the driving bush 16, except for a minor axial spacing of, e.g., 2 mm., up to the rear end of the shaft 4 in the region of the serrations 19, 20. The ball bearing 22 would be eliminated; the radial play between the trunnion 4'' and the driving bush 16 could be relatively small, since thereby the free rotatability of the shaft 4 in the normal operating condition would not be affected.

Figure 1A:
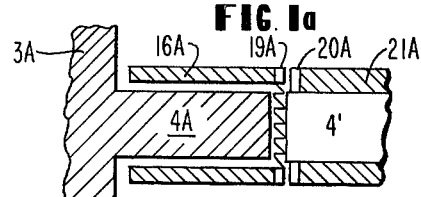
FIG. 1A is a partial schematic view depicting a modified arrangement of a portion of the power device of FIG. 1.

FIG. 1A schematically illustrates an embodiment with trunnion 4A firmly joined to the housing 3A. This trunnion 4A rotatably supports a driving bush 16A which cooperates with serrations 19A, serrations 20A of member 21A, in a manner analogous to that described above for the embodiment of FIG. 1.

Figure 2:
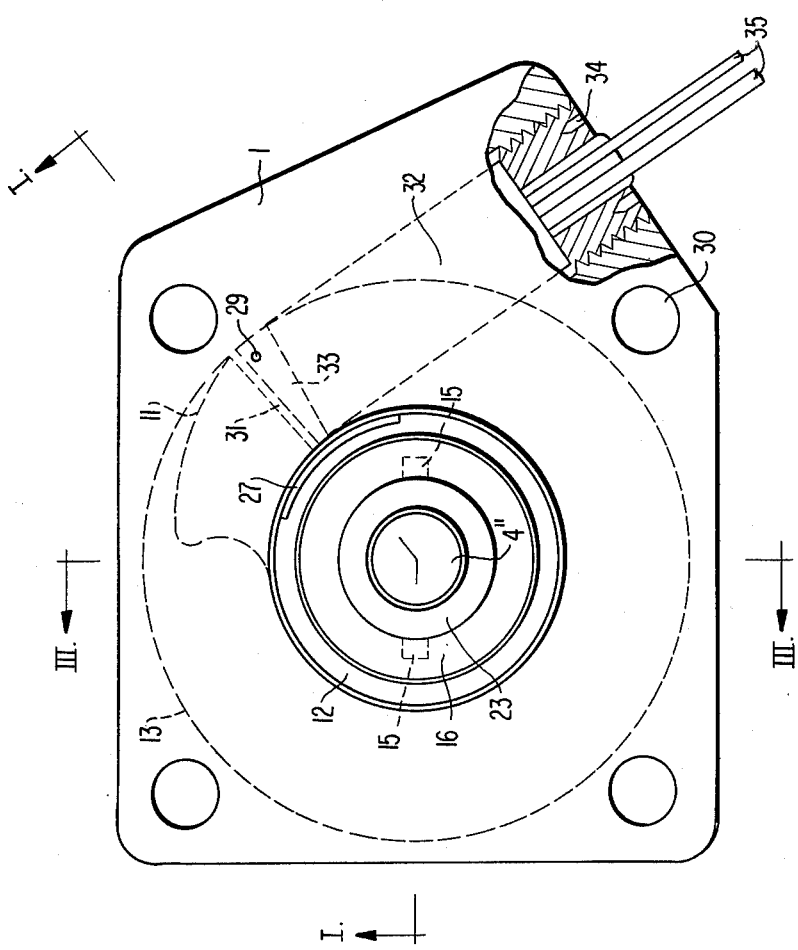
FIG. 2 is an end view taken in the direction of arrow A in FIG. 1 and with the housing lid removed.

Referring to FIG. 2, the housing 1 is provided with four axial bores 30 receiving the screws not illustrated, for joining the housing 1 to the housing angle plate 2 and the housing lid 3. The outer wall surface of the guide duct 13, as well as the rotary piston 11 inserted therein and being in the starting position, with the shearing element 29 and the disk-shaped sealing element 31, are shown in dashed lines. The compressed-gas generator 32 is inserted gas-tight tangentially from the side in the guide duct 13; this generator extends practially up to the piston area 33 of the rotary piston 11 to be exposed to the compressed gases. The compressed-gas generator 32 is fashioned as an electrically ignitable propellant charge cartridge with a screw plug 34 and the two ignition lines 35. The rear end of the shaft section 4'', of the cover ring 23, of the driving bush 16 with the two slide springs 15, shown in dased lines, and of the piston foot 12 with the recess 27 are shown in a plan view in FIG. 2. The recess (opening) 27 here represents the beginning of the helical groove 28 in the piston foot 12 and connects the pressure space between the compressed-gas generator 32 and the piston area 33 with the gas accumulation chamber 26.

Figure 3:
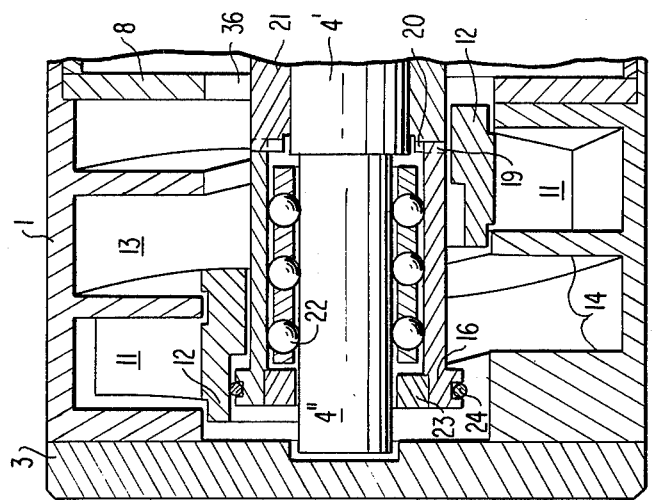
FIG. 3 is a sectional view along line III—III in FIG. 2 with two different rotary piston positions schematically depicted.

The operation of the rotary power device is as follows: When a set acceleration value has been exceeded during an accident situation, a preferably electronic sensor transmits the ignition signal for the propellant charge cartridge. The thus-produced compressed gases flow against the piston area 33 of the rotary piston 11 and simultaneously by way of the opening 27 into the gas accumulation chamber 26. After a sufficiently high gas pressure has been built up in chamber 26, the driving bush 16 is shifted axially toward the front according to arrow A in FIG. 1 until the serrations 19, 20 according to FIG. 3 are in meshing engagement, so that then the rotary piston 11 and the shaft 4 or the belt sleeve 5 are positively joined with each other in the peripheral direction. Practically simultaneously with the axial displacement of the driving bush 16, the rotary piston 11 is set into rotation, the shearing element 29 being sheared off. The rotary piston 11 here rotates according to FIG. 2 in the counterclockwise direction.

In FIG. 3, two different rotary piston positions are illustrated. In the top half of the figure, the rotary piston 11 is shown shortly after the beginning of its rotational movement, while the lower half of the figure shows the rotary piston 11 after it has reached its final position after about 1 ½ revolutions. For reasons of drawing technique, the piston foot 12 was omitted in the respectively other half of the figure. The air present in front of the rotary piston 11 in the guide duct 13 was essentially displaced, during the movement of the rotary piston 11, into the spring chamber 9 by way of the opening 36 of the separating disk 8. The total procedure starting with the ignition signal to the attainment of the final position of rotary piston 11 lasts, for example, 6–10 milliseconds, wherein the forces occurring in the belt 7 are, for example, between 200 and 400 kp. (= kilopond, unit for force, corresponds to kg. = unit for mass).

Figure 4A:
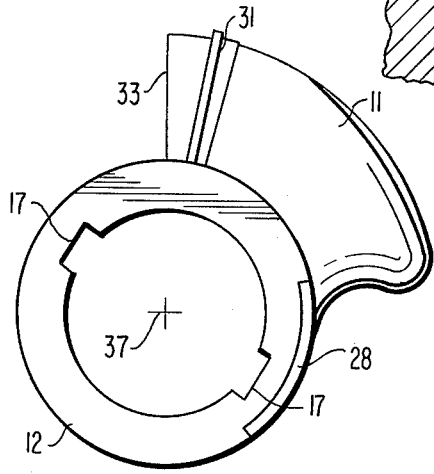
FIG. 4a is an end view of the rotary piston used with the device of FIG. 1.

The rotary piston 11 shown in a lateral view in FIG. 4a is provided on the inner wall surface of the annular-cylindrical piston foot 12 with the two grooves 17 extending over the entire length and intended for the reception of the slide springs 15. The piston area 33 under the effect of the compressed gases is arranged in an axial plane, i.e. its imagined extension passes through the axis 37 of the rotary piston 11. Close to the piston area 33, the disk-shaped sealing element 31 is arranged in a cutout. The helically shaped groove 28 formed in the outer wall surface of the piston foot 12 can be seen in its front termination. The length of the rotary piston 11 in the peripheral direction is dimensioned so that the effective forces are flawlessly transmitted to the piston foot 12. The radial height of the rotary piston 11 gradually decreases toward the end oppositely to the piston area 33.

Figure 4B:
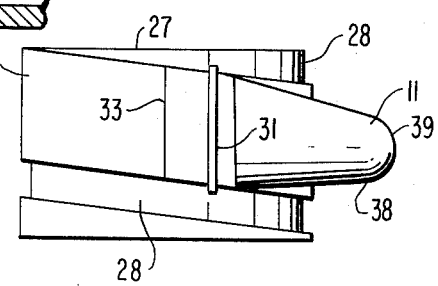

In FIG. 4b, the rotary piston 11 is shown in a horizontal projection. The groove 28 with its rearward termination 27 can clearly be seen, together with the lateral surfaces 38 and 39 mutually inclined toward each other for reducing the axial width of the rotary piston 11.

Figure 5:
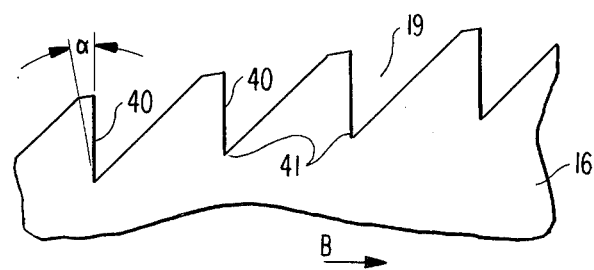
FIG. 5 is a schematic view which shows a fragmentary view of the serration of the driving bush of the device of FIG. 1, in a developed projection, on an enlarged scale.

The serration 19 of the driving bush 16 is fashioned, as seen in FIG. 5, in the manner of a sawtooth profile, wherein the tooth flanks 40 contacting the counter serration 20 — as seen from the tooth bottom 41 — are inclined to a minor extent into the direction of rotation indicated by the arrow B. The angle of inclination $\alpha$ can amount to up to about 20°. The serration 20 of the shaft 4 and/or of the coupling sleeve 21 is fashioned in a mirror-image relation thereto.

The rotary power device of this invention has been explained hereinabove in connection with the preferred example of a tensioning mechanism for safety belts in airplanes, automotive vehicles, or the like. However, the application of this rotary power element is nowise limited to safety belts or also safety nets, as well as similar safety devices in conveyances to be tensioned in case of an accident situation; rather, this rotary power element is basically of advantage in all those cases where kinematic processes, wherein a rotary motion occurs, are to be executed in response to a signal. Examples in this connection are the reeling up of ropes, the tensioning of spiral (coil) springs, or also the starting operation of piston engines (reciprocating engines).

While we have shown and described several embodiments in accordance with the present invention, it is understood that the same is not limited thereto but is susceptible of numerous changes and modifications as known to those skilled in the art and we therefore do not wish to be limited to the details shown and described herein but intended to cover all such changes and modifications as are encompassed by the scope of the appended claims.

We claim:

1. Rotary power device comprising:
   a housing,
   a helically wound duct formed in the housing,
   a rotary piston guided in said duct,
   compressed gas supply means for supplying compressed gas against a pressure face of said piston to impart rotary movement to said piston,
   a rotatable shaft,
   and coupling means for coupling said shaft to said piston such that said shaft is rotated in response to movement of said rotary piston guided in said duct.

2. Device according to claim 1, wherein the pressure face of the piston which is exposable to the compressed gases is fashioned as a planar surface disposed in an axial plane of the piston which axial plane contains the axis of rotation of the piston.

3. Device according to claim 1, wherein the piston is fashioned with an axial width and a radial height which decreases in the direction of rotation of the piston.

4. Device according to claim 1, wherein the piston is equipped, close to pressure face thereof, with one or more notches and with disk-shaped sealing elements inserted in such notch or notches, which elements project outwardly to a minor extent in the axial and radial directions and are in contact with the wall of the duct.

5. Device according to claim 1, wherein the piston is held in a starting position by means of a shear element.

6. Device according to claim 1, characterized in that the compressed gas supply means are arranged in the housing so that the compressed gases, in a starting position of the piston, flow vertically against the pressure face thereof.

7. Device according to claim 1, wherein said piston includes an annular piston foot which extends around the axis of rotation of the shaft, and wherein said coupling means connects said piston foot to said shaft for rotation therewith while permitting axial displacement of said piston with respect to said shaft.

8. Device according to claim 7, wherein a ball bearing, preferably with several balls arranged in axial succession, is provided between the shaft and the driving bush.

9. Device according to claim 7, wherein the driving bush is disposed on a trunnion arranged coaxially to the shaft and firmly joined to the housing so that the driving bush is rotatable on this trunnion and is displaceable axially toward the front in the direction toward the shaft.

10. Device according to claim 7, wherein an annular sealing element is arranged in the zone of the rear end of the driving bush between the latter and the piston.

11. Device according to claim 7, wherein lateral boundary walls of said duct extend radially inwardly up to the piston foot.

12. Device according to claim 11, wherein tooth flanks of the serration coming into pressure contact with the counter serration are inclined to a minor extent — as seen from the bottom of the tooth — at the driving bush in the direction of rotation of the piston and at the shaft in opposition thereof.

13. Device according to claim 11, wherein said rotatable shaft is rotatable with a wind-up mechanism for a safety belt of a passenger restraint system of a vehicle.

14. Device according to claim 13, wherein tooth flanks of the serration coming into pressure contact with the counter serration are inclined to a minor extent — as seen from the bottom of the tooth — at the driving bush in the direction of rotation of the piston and at the coupling sleeve in opposition thereto.

15. Device according to claim 14, wherein the sealing element is fashioned as an annular edge, which can be sheared off, this edge projecting radially outwardly on the driving bush and being in contact with the piston foot.

16. Device according to claim 7, wherein a driving bush is arranged between the shaft and the piston foot, the shaft being freely rotatable with respect to the driving bush when said driving bush is in a first axial position corresponding to an initial postion of the piston, both the bush and the shaft then being positively lockable together under displacement of the driving bush in the axial advancement direction of the piston; and wherein the piston is positively connected with the driving bush in the peripheral rotating direction and is displaceable on the bush in the axial direction.

17. Device according to claim 16, wherein a small gas accumulation chamber is formed behind the driving bush when said driving bush is in said first axial position, this gas accumulation chamber being in communication with a pressure space between the compressed-gas supply means and the pressure face of the piston when the piston is in its initial position.

18. Device according to claim 16, wherein the pressure face of the piston which is exposable to the compressed gases is fashioned as a planar surface disposed in an axial plane of the piston which axial plane contains the axis of rotation of the piston.

19. Device according to claim 16, wherein the piston is fashioned with an axial width and a radial height which decrease in the direction of rotation of the piston.

20. Device according to claim 16, wherein the piston is equipped, close to pressure face thereof, with one or more notches and with disk-shaped sealing elements inserted in such notch or notches, which elements project outwardly to a minor extent in the axial and radial directions and are in contact with the wall of the duct.

21. Device according to claim 16, wherein the piston foot has a helically wound groove on its outer wall surface, the boundary walls of the duct formed in the housing extending into this groove in the manner of a labyrinth seal.

22. Device according to claim 16, wherein the piston is held in a starting position by means of a shear element.

23. Device according to claim 16, wherein said compressed gas supply means includes a cartridge of compressed gas and detonating means for bursting said cartridge to release said gas to flow against said pressure face in response to a detected predetermined acceleration of a vehicle carrying said device.

24. Device according to claim 16, wherein said housing includes means for accommodating a torsional tensioning spring which is continually engageable with said shaft to assure continual tensioning of a safety belt or the like attached to said shaft.

25. Device according to claim 16, characterized in that the compressed gas supply means are arranged in the housing to that the compressed gases, in a starting position of the piston, flow vertically against the pressure face thereof.

26. Device according to claim 25, wherein said compressed gas supply means includes a cartridge of compressed gas and detonating means for bursting said cartridge to release said gas to flow against said pressure in response to a detected predetermined acceleration of a vehicle carrying said device.

27. Device according to claim 16, wherein the driving bush has a serration on its annular end face which — as seen in the axial advancing direction of the piston — is disposed at the front, this serration, together with a corresponding counter serration on an opposed end face of the shaft, providing the locking action.

28. Device according to claim 27, wherein the opposite end face of the shaft is formed by means of a coupling sleeve pushed onto the shaft and firmly joined to the latter.

* * * * *